United States Patent
Stenfort

(10) Patent No.: US 8,181,078 B2
(45) Date of Patent: May 15, 2012

(54) METHODS AND SYSTEM FOR SIMPLIFIED SAS ERROR RECOVERY

(75) Inventor: Ross J. Stenfort, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1007 days.

(21) Appl. No.: 12/138,309

(22) Filed: Jun. 12, 2008

(65) Prior Publication Data

US 2009/0313443 A1 Dec. 17, 2009

(51) Int. Cl.
*G08C 25/02* (2006.01)
*H04L 1/18* (2006.01)
*H03M 13/00* (2006.01)

(52) U.S. Cl. ........ 714/748; 714/751; 714/799; 714/821; 714/712; 714/749; 711/159; 710/106; 370/241; 370/252

(58) Field of Classification Search .................. 714/748, 714/749, 751, 799, 821, 712; 711/159; 710/106; 370/241, 252
See application file for complete search history.

(56) References Cited

U.S. PATENT DOCUMENTS

| 4,344,171 | A | * | 8/1982 | Lin et al. ...................... 714/751 |
| 5,524,218 | A | * | 6/1996 | Byers et al. .................. 710/305 |
| 7,586,930 | B2 | * | 9/2009 | Koski ............................ 370/442 |
| 7,747,922 | B2 | * | 6/2010 | Mielczarek et al. .......... 714/748 |
| 2008/0195912 | A1 | * | 8/2008 | Mende et al. ................. 714/752 |

* cited by examiner

*Primary Examiner* — John J Tabone, Jr.
(74) *Attorney, Agent, or Firm* — Duft Bornsen & Fishman LLP

(57) ABSTRACT

Methods and systems for simplified error recovery in a SAS device. A SAS device (e.g., a SAS/SSP target device such as a storage device) enhanced in accordance with features and aspects hereof NAKs a received frame that has an error and then NAKS all subsequently received frames, regardless of whether received with or without error, until the connection is closed. The second SAS device (e.g., a SAS/SSP initiator) then performs required error recovery by re-establishing a connection and re-transmitting all previously NAKed frames. The enhanced SAS thereby simplifies logic for error recovery.

10 Claims, 3 Drawing Sheets

US 8,181,078 B2

METHODS AND SYSTEM FOR SIMPLIFIED SAS ERROR RECOVERY

RELATED PATENTS

This patent is related to commonly owned U.S. patent application Ser. No. 11/644,549 entitled Serial Advanced Technology Attachment (SATA) and Serial Advanced Small Computer System Interface (SCSI) (SAS) Bridging" which is hereby incorporated by reference. This patent is also related to commonly owned U.S. patent application Ser. Nos. 12/138, 321 and 12/138,315 filed herewith which are also hereby incorporated by reference.

BACKGROUND

1. Field of the Invention

The invention relates to Serial Attached SCSI (SAS) communications and in particular relates to methods and systems providing simplified error recovery in response to detecting an error in a received frame in a SAS device.

2. Discussion of Related Art

Many present-day high performance storage systems utilize the SAS family of protocols to provide high performance and high reliability for a wide range of storage system applications. SAS provides the performance and flexibility of the long standardized SCSI command set while providing simplified communication coupling through the use of high speed serial communication media and protocols rather than wide parallel bus structures.

Among the suite of protocols within the SAS specification is the Serial SCSI Protocol (SSP). In general in SSP, SCSI commands and data are transmitted as frames on a SAS connection using the SSP protocol. In general, in accordance with the SCSI protocols and in particular in accordance with the SSP protocols, a number of command and/or data transmissions may be sent from an initiator device to a target device before an acknowledgment of successful processing is received (an ACK). Although each such a frame is eventually acknowledged, a plurality of such frames may be forwarded from the initiator to the target before the initiator pauses to await receipt of an appropriate acknowledgement for each successfully processed frame. The acknowledgement indicates correct receipt of a corresponding transmitted frame and completion of appropriate processing therefore. If an error occurs in a particular frame transmission, a negative acknowledgement (NAK) will be received by the initiator from the target device. Appropriate error recovery techniques may be employed as between the initiator and target devices to cause retransmission of any frames that were NAKed by the target device. The SCSI, SAS, and SSP standards as well as other related standards are well known to those of ordinary skill in the art and are well documented publicly at www.t10.org if the reader requires any background material.

Recovery from an erroneous transmission within the target device can be particularly complex. For example, according to the SAS and SSP protocol specifications, any frame that is ACKed must be correctly processed by the target device even if an earlier frame transmission was NAKed. Thus numerous complex boundary conditions and sequences need to be handled in a target device when a frame is NAKed but subsequently transmitted frames may have been correctly received and subsequently processed and ACKed.

Further complexities arise in particular SAS target device designs where a separate command buffer and data buffer are provided. Routing logic within such a SAS/SSP target device may determine whether a received frame is a command frame or a data frame based on, for example, a first received byte or word of a received frame. Thus the first received byte or word of a transmitted frame, if properly received, indicates whether the entire frame should be stored in the command buffer for further processing or in the data buffer for further processing. However, if the frame is received with an error, it is possible that the first byte or word thereof may be erroneous and thus the erroneous frame may be incorrectly stored in an improper buffer (i.e., erroneously mischaracterized as a data frame or a command frame based on an erroneous first byte or word). A Cyclic Redundancy Check (CRC) error is typical of an exemplary error condition in receipt of a frame. If a frame is received with a CRC error, the logic of the SAS device may improperly characterize the frame as data or command. Numerous other error conditions may arise in a SAS or SSP transmission all of which may encounter different boundary conditions and error recovery complexities within a SAS target device.

It is thus an ongoing challenge in the design of SAS/SSP devices to correctly process all received frames even in the presence of an erroneous frame in the midst of correctly received frames.

SUMMARY OF THE SOLUTION

The present invention solves the above and other problems, thereby advancing the state of the useful arts, by providing methods and associated systems for simplified error recovery within a SAS device. In general, features and aspects hereof provide that upon detection of any error in a received frame, that erroneous frame and all frames received after the erroneous frame will be NAKed and discarded. Regardless of whether the subsequent received frames are correctly received or incorrectly received, all such frames following receipt of the first erroneous frame will be NAKed to simplify error recovery processing within the receiving SAS device. The transmitting SAS device may be required to retransmit more data but the design of the receiving SAS device (e.g. a SAS target device such as a storage device or disk drive) is vastly simplified and thus costs of the target device may be significantly reduced. In addition, testing of the target device is simplified by eliminating complexities of "boundary" conditions in the variety of sequences of frames that may be transmitted with one or more errors during a connection.

One aspect hereof provides a method operable in a first SAS device adapted for coupling to a second SAS device. The method includes establishing a connection between the first and second SAS devices. The method then detects an error in a received frame from the second SAS device. The method responds to the error in the received frame with a negative acknowledgment (NAK). The method also further responds with a NAK to all frames received after the received frame with the detected error until the connection is closed. Eventually the connection is closed. Other error recovery may then proceed by operation of the second SAS device retrying transmissions of NAKed frames.

In another aspect, a system is provided that includes a first Serial Attached SCSI (SAS) device adapted to receive frames and a second SAS device adapted to transmit frames to the first SAS device. A SAS fabric couples the first and second SAS devices. The first SAS device includes an error detector adapted to detect an error in a received frame received from the second SAS device and a negative acknowledgment (NAK) generator responsive to the error detector for generating a NAK in response to every received frame following detection of the error. The NAK generator is further adapted to respond to each received frame with a NAK after detection of the error and until the connection between the first and second SAS devices is closed.

DETAILED DESCRIPTION OF THE DRAWINGS

Figure 1:
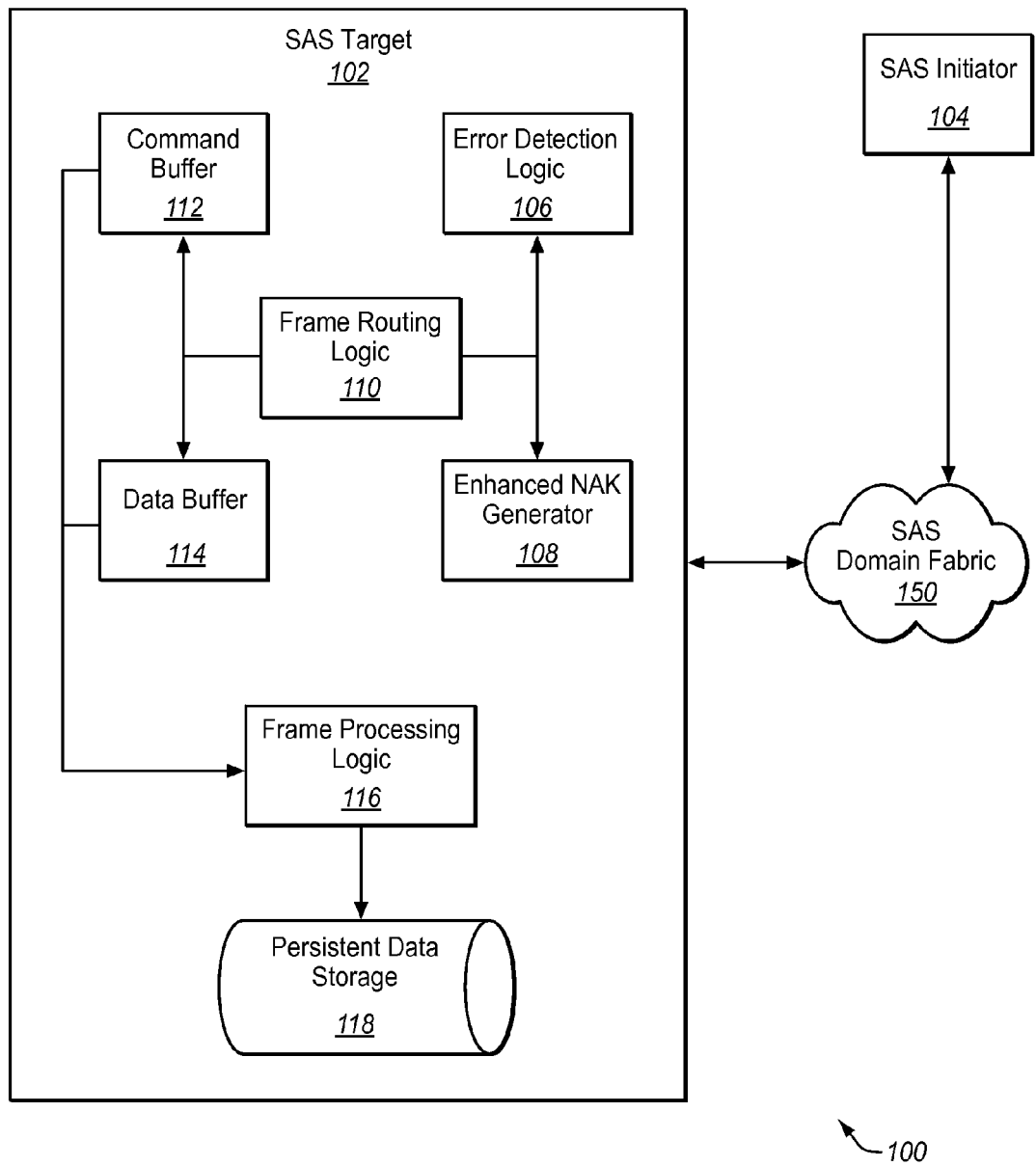
FIG. 1 is a block diagram of an exemplary system including a first and second SAS device wherein the first device has simplified ACK/NAK processing in accordance with features and aspects hereof

FIG. 1 is a block diagram of an exemplary system 100 showing a first SAS device (SAS target device 102) and a second SAS device (SAS initiator 104) having enhancements in accordance with features and aspects hereof to simplify ACK/NAK processing and error recovery in the first SAS device. SAS target device 102 may be, for example, a storage device such as a disk drive. SAS initiator 104 may be a host computer or other storage controller in a larger storage system. SAS target device 102 and SAS initiator 104 may be coupled through a SAS domain fabric 150 comprising zero or more SAS expanders for flexibility in coupling between SAS initiator devices and SAS target devices.

In particular, SAS target device 102 is a SCSI device that may utilize the SSP protocol in communications with a SCSI controller such as SAS initiator 104. As noted above, in accordance with SCSI standards, SAS initiator 104, once a SAS connection is established with SAS target device 102, may send multiple command and/or data blocks as SAS frames that may be buffered within SAS target device 102 before any acknowledgement information is returned from SAS target 102 to SAS initiator 104.

In accordance with the enhanced features and aspects hereof, SAS target device 102 may include error detection logic 106 for detecting errors in a received frame. Such errors may include, for example, CRC errors as well as other protocol related errors relating to the SSP and/or SAS protocol management of frames. When good frames (frames received without errors) are received, in one exemplary embodiment, frame routing logic 110 within SAS target device 102 may route the SCSI data or command into an appropriate buffer based on the type of frame received. Where the received frame is a good frame containing SCSI commands, frame routing logic 110 routes the received frame into command buffer 112 for temporary storage until processing of the command information may proceed. Where a good received frame presents SCSI data, frame routing logic 110 routes the received frame into data buffer 114 for temporary storage to await appropriate processing. Frame processing logic 116 proceeds substantially asynchronously with respect to other logic in SAS target device 102 to process previously stored or buffered commands and/or data stored in command buffer 112 or data buffer 114. Logic within frame processing logic 116 assures that all frames are processed in the proper order to provide the desired result within SAS target device 102. Processing of commands and data from buffers 112 and 114 by frame processing logic 116 generally results in storage or retrieval of information on persistent data storage medium 118. Where, for example, SAS target 102 is a storage device such as a disk drive, persistent data storage 118 may be an optical or magnetic recording medium on which data may be written and from which data may be read back. Such processing of SCSI commands and data in the normal course of operation of SAS target device 102 is well known to those of ordinary skill in the art and thus details of the operation of such buffering, routing, and processing are omitted herein for simplicity and brevity of this discussion.

Enhanced NAK generator 108 enhances the operation of SAS target device 102 by simplifying the recovery required within SAS target device 102 when an erroneous frame is detected in transmissions from the second SAS device (e.g., SAS initiator 104). As discussed further herein below, when a first error is detected in any received frame from SAS initiator 104 (detected by error detection logic 106), enhanced NAK generator 102 assures that the erroneous received frame and all subsequent received frames will be negatively acknowledged (NAKed). Enhanced NAK generator 108 therefore simplifies recovery within SAS target 102 by eliminating requirements within SAS target device 102 to assure proper sequencing and processing of correctly received frames that follow receipt of an erroneous frame. Rather, all frames following an erroneously received frame will be NAKed forcing the second SAS device (e.g., SAS initiator 104) to perform further recovery processing by retransmitting all frames starting with the erroneously received frame and continuing in sequence with all subsequently transmitted frames. By simplifying error recovery processing in SAS target device 102, significant logic within SAS target device 102 may be eliminated and thus the costs of the first device (SAS target device 102) may be significantly reduced.

Those of ordinary skill in the art will readily recognize numerous additional and equivalent elements that may be present within a fully functional SAS target device 102. Such additional and equivalent elements are omitted herein for simplicity and brevity of this discussion.

Figure 2:
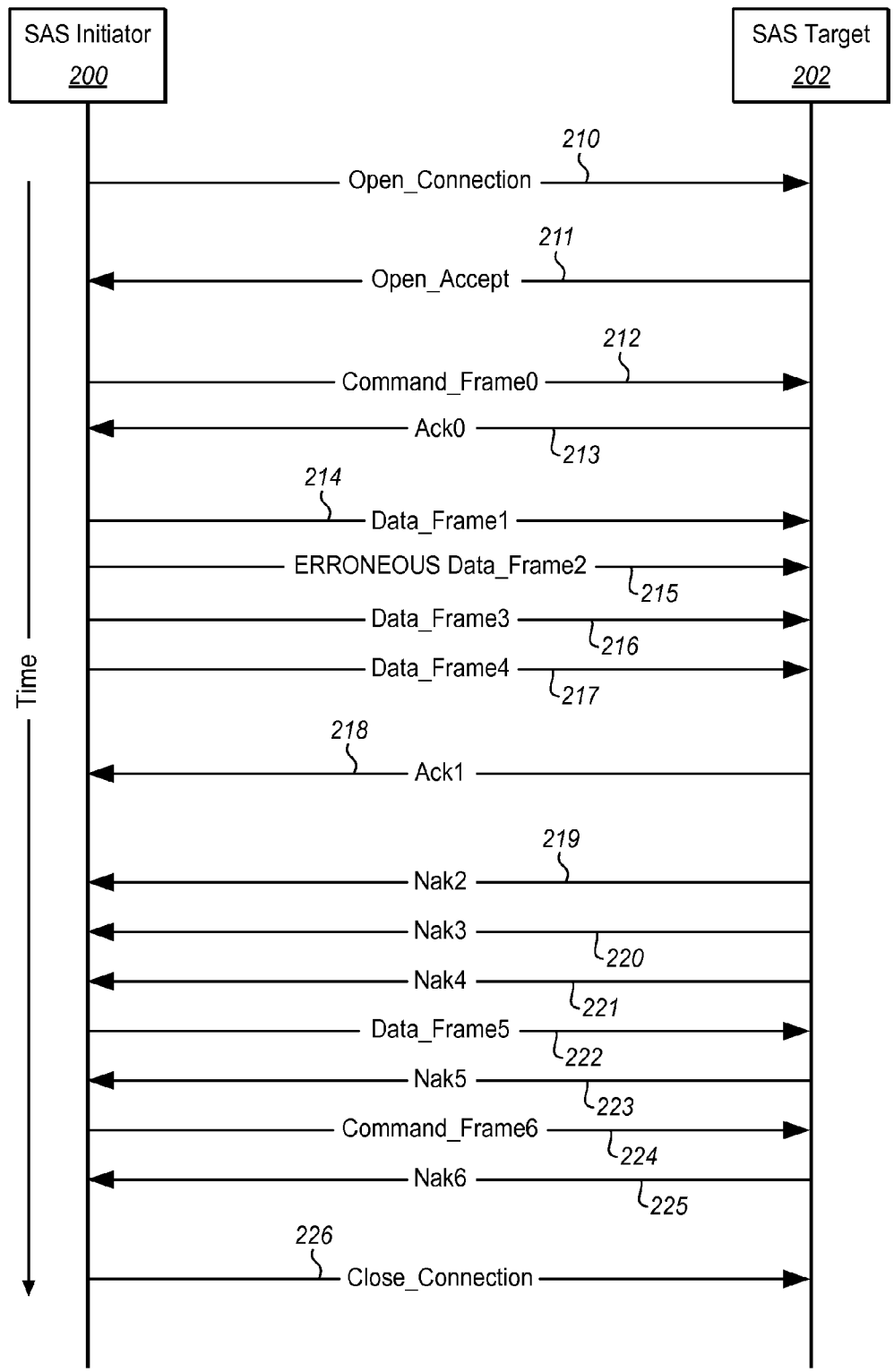
FIG. 2 is a diagram showing an exemplary exchange between a SAS initiator and a SAS target enhanced in accordance with features and aspects hereof.

FIG. 2 is a diagram depicting exemplary exchanges between a SAS initiator device 200 a SAS target device 202 using the SAS SSP protocol. The exemplary exchanges are shown as directed arrows from initiator 200 to target 202 as time moves forward downward on the diagram. Initiator 200 first directs an open connection request to SAS target 202 requesting establishment of a SAS/SSP connection between the two devices. Target 202 responds with an open accept frame 211 indicating establishment of the requested connection. Initiator 200 may then forward a Command_Frame0 212 to the target device which, after appropriate processing by target 202, is positively acknowledged with the return of the ACK0 213 frame. In accordance with SCSI standard protocols, initiator 200 may then forward a sequence of data frames including, for example, Data_Frame1 214, Data_Frame2 215, Data_Frame3 216, and Data_Frame4 217. As is generally known in the art, and in accordance with the SCSI protocols, a number data frames may be forwarded by the initiator to the target before the initiator must wait for the corresponding sequence of acknowledgements.

As indicated in FIG. 2, Data_Frame2 215 is received in SAS target 202 as an erroneous frame—an error detected in the received frame such as a CRC error or other related data and protocol errors. Eventually, target device 202 will complete processing of Data_Frame1 214 (a data frame received without error) and forward an appropriate acknowledgement frame ACK1 218 to initiator device 200 indicating completion of the processing of Data_Frame1 214. Subsequently, SAS target 202 detects that Data_Frame2 215 was received with an error and returns an appropriate negative acknowledgement frame (NAK2 219).

In accordance with features and aspects hereof, although Data_Frame3 216 and Data_Frame4 217 were received without error, the simplified error recovery logic within SAS target 202 sends a negative acknowledgement (NAK3 220 and NAK4 221) for all subsequently received frames following receipt of the erroneous Data_Frame2 215. Continuing further in time downward on FIG. 2 Data_Frame5 222 is received as a correct data frame but is none the less negatively acknowledged by NAK5 223. In like manner, Command_Frame6 224 is correctly received but none the less is negatively acknowledged by return of NAK6 225. Eventually, SAS initiator 200 will detect the sequence of negative acknowledgements and close the connection with a close connection request 226. On receipt of such a close connection, SAS target 202 will reset its error recovery logic to allow for ongoing establishment of a new connection and retransmission of any frames that were negatively acknowledged.

Those of ordinary skill in the art will readily recognize that any sequence of command and data frames may be provided between SAS initiator and 200 SAS target 202. For example, the timing of NAK2 in response to the first erroneous frame (Data_Frame2) may vary such that any number of additional frames may be received before or after the NAK2 message is actually transmitted. Thus the particular exemplary sequence of FIG. 2 is intended merely to suggest one possible sequence where it can be shown that the enhanced SAS target 202 has dramatically simplified error recovery processing. Any number of exemplary sequences of frame transmissions may be supported by features and aspects hereof.

Figure 3:
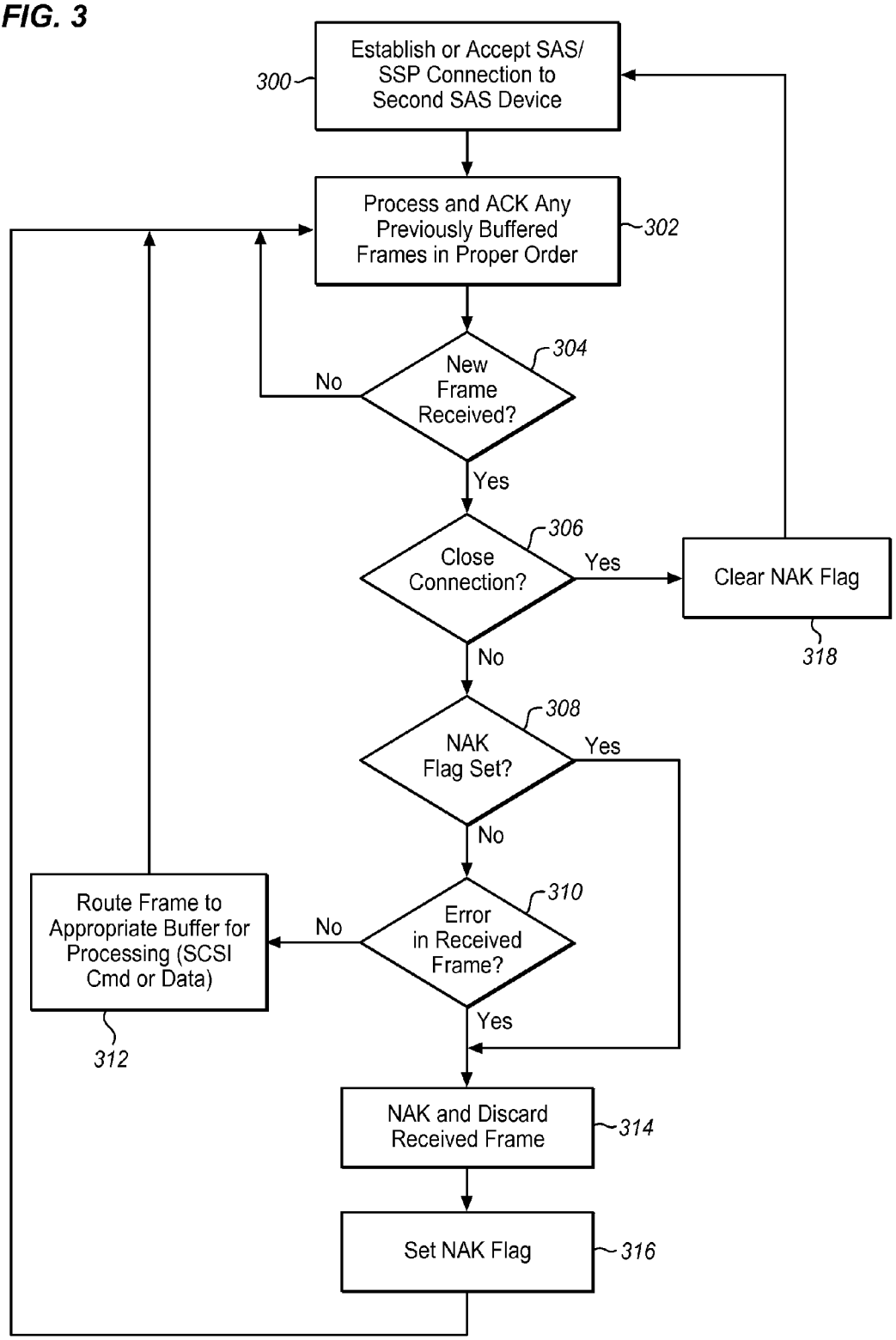
FIG. 3 is a flowchart describing exemplary methods to simplify ACK/NAK processing in a SAS device in accordance with features and aspects hereof.

FIG. 3 is a flowchart describing an exemplary method in accordance with features and aspects hereof to simplify error recovery processing in a first SAS device coupled to a second SAS device. As discussed above, the first SAS device may be a SAS target device supporting the SCSI protocol through the SAS/SSP protocol. Such a target device may be, for example, a storage device such as a disk drive. The corresponding second device may be a SAS initiator supporting the SSP protocol such as the host bus adapter (HBA) in an attached computing system or a storage controller within a storage subsystem. The processing of FIG. 3 is therefore performed by the enhanced first SAS device—e.g., the enhanced SAS target device. Step 300 represents processing to establish or accept a SAS/SSP connection with the second SAS device. As well known to those of ordinary skill in the art, a SAS initiator generally initiates processing to establish a connection with a SAS target device. However, those of ordinary skill in the art also readily recognize that a target device may act in the role of an initiator under various conditions specified by the SAS and SSP protocols such as to reconnect after a disconnect process.

Having established such a connection, step 302 represents ongoing processing within the first SAS device to process and appropriately acknowledge (ACK) any previously buffered frames. The frames are generally buffered or queued in a FIFO structure with appropriate IDs or sequence numbers to indicate the proper sequence of processing for any previously buffered frames. In one exemplary embodiment as discussed above with respect to FIG. 1, routing logic within an enhanced SAS device may route SCSI command frames into a command buffer for further processing by step 302 while SCSI data frames may be routed to a data buffer for subsequent processing by step 302. Those of ordinary skill in the art will readily recognize numerous well-known techniques to assure processing of all received commands and/or data in the proper sequence. Step 304 then monitors whether a new frame has been received during processing of step 302. Again, those of ordinary skill in the art will readily recognize that processing of steps 302 and 304 may be substantially concurrent such that receipt of a new frame may cause an interrupt of processing of previously buffered frames by step 302. Such design choices will be readily apparent to those of ordinary skill in the art. If no new frame has been received, processing continues in steps 302 and 304 until step 304 detects reception of a new frame. Upon receipt of a new frame, step 306 determines whether the new frame represents a close connection request to close the connection previously established by processing of step 300. If so, step 318 clears a NAK flag as discussed further herein below to reset the NAK processing logic of the method. Processing then continues looping back to step 300 to await establishment of a next connection to permit transmission of additional data or retransmission of previously transmitted data. In other words, any required error recovery between the first and second SAS devices may be performed by closing the connection and reestablishing a new connection to begin retransmission of any required frames that were previously NAKed.

If step 306 determines that the newly received frame is not a close connection request, step 308 next tests whether the NAK flag has been previously set indicating that all further frame received frames are to be NAKed until the current connection is closed. If not, step 310 next determines whether the received frame was received correctly or with an error. If step 310 determines that the frame was received without error, step 312 routes the received frame to an appropriate buffer (e.g., command buffer or data buffer) for later processing as discussed above in step 302. The method continues looping back to steps 302 and 304 to process any buffered frames and await receipt of new frames.

If step 310 determines that a frame was received with an error, step 314 discards the received frame and forwards an appropriate NAK message indicating a negative acknowledgement of the received frame. Step 316 then sets the local NAK flag to indicate that all subsequently received frames are to be discarded and NAKed regardless of whether they were received with an error or received correctly. Processing continues looping back to steps 302 and 304 to process any previously buffered correctly received frames and to await receipt of a next frame.

Returning again to step 308, once step 316 has set the NAK flag, step 308 will assure that all subsequently received frames, whether received with or without an error, will be negatively acknowledged (NAKed). Eventually, as discussed above, step 306 will detect receipt of a close connection frame and clear the NAK flag through processing of step 318 to reset the error recovery logic within the first SAS device.

Frequently, the SAS/SSP protocol is implemented within a SAS device utilizing state machine models as specified in the SAS specifications. Those of ordinary skill in the art will readily recognize modifications to the standard SAS/SSP state machines to implement the enhancements described in FIGS. 1 through 3. The standards describe requirements of a state machine to be compliant with the SAS/SSP standards. For example, SAS 1.1 and SAS 2 specifications in section 7.16.3 specify particular requirements of the ACK/NAK processing to be performed by a fully compliant SAS/SSP device. Though features and aspects hereof may violate these specifications, the violation does not preclude a device so enhanced from communicating properly with fully compliant other SAS devices. Particular modifications to the standard SAS/SSP state machines to implement the simplification features and aspects hereof will be readily apparent to those of ordinary skill in the art as matters of design choice.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable in a first Serial Attached SCSI (SAS) device configured to couple to a second SAS device, the method comprising:
    establishing a connection between the first and second SAS devices;
    detecting an error in a received frame from the second SAS device;
    responding to the error in the received frame with a negative acknowledgment (NAK);
    responding with a NAK to all frames received after the received frame with the detected error until the connection is closed; and
    closing the connection.

2. The method of claim 1
    wherein the step of establishing a connection further comprises:
    establishing a connection using the Serial SCSI Protocol (SSP) of SAS.

3. The method of claim 1
    wherein the step of detecting further comprises:
    detecting a CRC error in the received frame.

4. The method of claim 1 wherein the first SAS device has a data storing received data frames for processing and wherein the first SAS device has a command buffer for storing command frames, the method further comprising:
    prior to detecting the error, performing the additional steps of:
    detecting whether a received frame is a data frame or a command frame;
    responsive to detecting that the received frame is a data frame, storing the received frame to the data buffer for processing as a data frame; and
    responsive to detecting that the received frame is a command frame, storing the received frame to the command buffer; and
    subsequent to detecting the error, performing the additional steps of:
    discarding the received frame with the error; and
    discarding all frames received after the frame with the detected error without storing the frames in either the data buffer or the command buffer.

5. A system comprising:
    a first Serial Attached SCSI (SAS) device configured to receive frames;
    a second SAS device configured to transmit frames to the first SAS device; and
    a SAS fabric coupling the first and second SAS devices, wherein the first SAS device further comprises:
    an error detector configured to detect an error in a received frame received from the second SAS device; and
    a negative acknowledgment (NAK) generator responsive to the error detector for generating a NAK in response to every received frame following detection of the error wherein the NAK generator is configured to respond to each received frame with a NAK after detection of the error and until the connection between the first and second SAS devices is closed.

6. The system of claim 5
    wherein the first and second SAS devices are configured to use the Serial SCSI Protocol (SSP) in exchanges therebetween.

7. The system of claim 5 wherein the error detector is further configured to detect a CRC error in the received frame.

8. The system of claim 5
    wherein the first SAS device further comprises:
    a data buffer for storing received data frames for further processing;
    a command buffer for storing received command frames for further processing; and
    routing logic coupled to the data buffer and coupled to the command buffer and coupled to the error detector,
    wherein the routing logic is configured to route the received frame to the data buffer when the received frame is a data frame and configured to route the received frame to the command buffer when the received frame is a command frame,
    wherein the routing logic is further configured to route each received frame for storage in the command buffer or for storage in the data buffer prior to detection of the error, and
    wherein the routing logic is further configured to discontinue routing of each received frame following detection of the error until the connection between the first and second SAS devices is closed.

9. A method operable in a Serial Attached SCSI (SAS) target device coupled to a SAS initiator, the method comprising:
    establishing a Serial SCSI Protocol (SSP) connection between the first and second SAS devices;
    receiving non-erroneous frames in the first SAS device from the second SAS device;
    sending positive acknowledgments (ACKs) for the received non-erroneous frames;
    detecting an error in a received frame; and
    sending negative acknowledgements (NAKs) for the received frame having the error and for all received frames received subsequent to detection of the error until the SSP connection is closed by the second SAS device.

10. The method of claim 9 further comprising:
    discarding the received frame having the detected error; and
    discarding all received frames received subsequent to detection of the error until the SSP connection is closed.

* * * * *